The present invention is concerned with an improved tubular bicycle steering fork assembly of brazed construction and a method of fabricating the same.

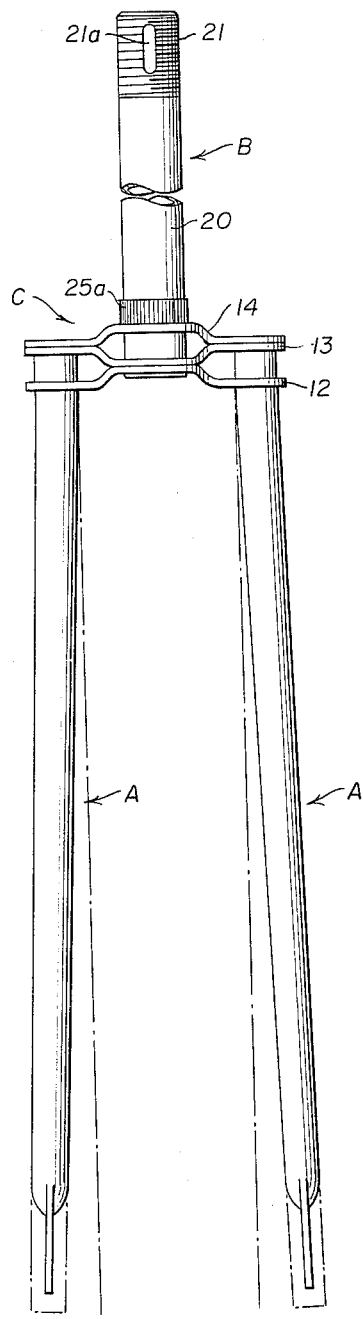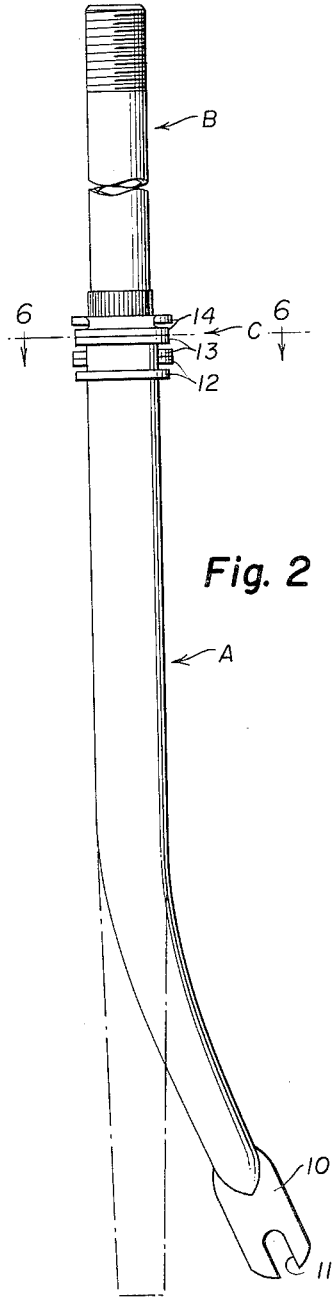
Fig. 1
Fig. 2
INVENTOR.
ALVIN P. DOUGLAS
BY Gobrick & Gobrick
ATTORNEYS Jan. 16, 1962   A. P. DOUGLAS   3,016,606
METHOD OF MANUFACTURING A BRAZED TUBULAR
BICYCLE STEERING FORK ASSEMBLY
Filed April 12, 1957   2 Sheets-Sheet 2
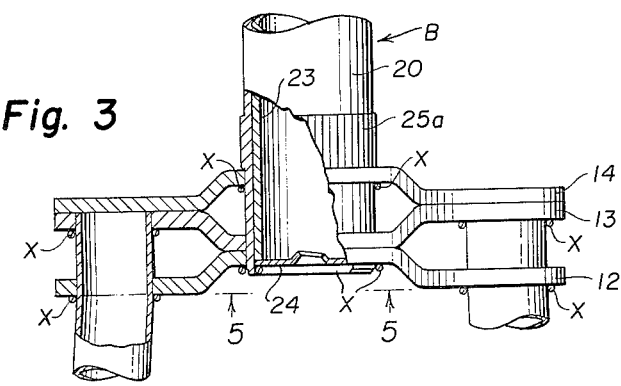
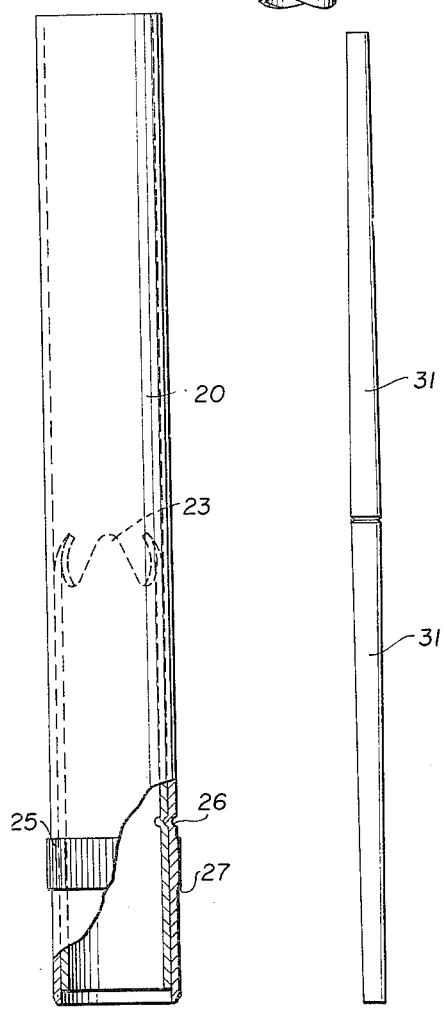
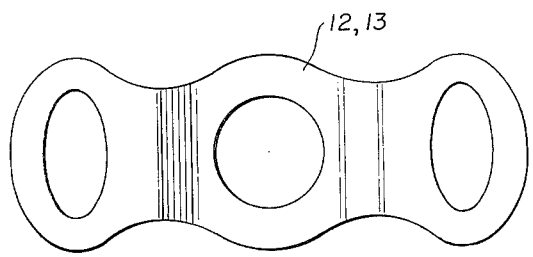
Fig. 4
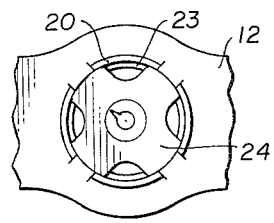
Fig. 5
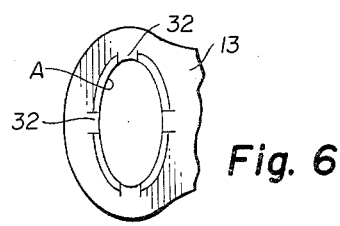
Fig. 6
INVENTOR.
ALVIN P. DOUGLAS
BY Gobrick & Gobrick
ATTORNEYS 3,016,606
METHOD OF MANUFACTURING A BRAZED TUBULAR BICYCLE STEERING FORK ASSEMBLY
Alvin P. Douglas, Cleveland Heights, Ohio, assignor to The Murray Ohio Manufacturing Company, Cleveland, Ohio, a corporation of Ohio
Filed Apr. 12, 1957, Ser. No. 652,547
2 Claims. (Cl. 29—480)

A conventional steering fork form comprises a stem portion to be journalled in a bicycle frame head post either directly as in older structure or through bearing cone members, a pair of generally parallel spaced dependent fork arms with upper ends secured through a crown or yoke to the bottom of the fork stem in one manner or other and having lower ends formed to receive and clamp the axle of a bicycle wheel located therebetween. Various particular bicycle steering fork structures proposed in the prior art generally have been concerned with providing a strong steering fork of good service life which nonetheless may be manufactured at relatively low cost, and correspondingly varied methods have been proposed for fabricating such forks by mass production methods. However some such structures, while per se simple, have not been adapted to simple tooling or simple production operations. Others, though produced by simple basic fabricating operations, have required heavy components to be adapted to the production methods desired militating against the desired light weight of a complete bicycle frame. Other disadvantages of prior fork structures and production methods will be adverted to in the following.

By the present invention there is provided a bicycle steering fork structure comprised of tubular elements and a few plate like connecting elements which are so arranged and brazed together that a light weight yet sturdy fork results. Further a general method of fabricating the instant fork structure is provided whereby forks of desired high quality can be produced by low-cost mass production methods, with a minimum of rejections in the various stages of production.

The fork includes a pair of downwardly tapering forwardly concavely curved roughly parallel tubular arms, the lower ends of which are respectively pressed closed and slotted to accommodate a wheel axle, while the upper ends by brazing are joined to each other and to a stem of tubular form by three generally similarly shaped formed plate elements comprising a shoulder or crown structure. The lower end of the stem is reinforced and provided with a fender attaching formation by insert elements. In general external appearance the finished fork assembly is similar to that disclosed in the brazed forks of prior U.S. Patent 585,043 to Metz or 1,403,257 to Lewis.

By the method of this invention, the three shoulder plates used in the crown or shoulder of identical external form are derived by blanking and forming unpierced blanks by the same or identical dies, and then piercing certain blanks to provide identical plates each with a round central stem opening and a pair of fork arm receiving lateral openings of apt form; and piercing another blank to form a plate with a like central stem opening.

A stem sub-assembly is produced by cutting off a blank from cylindrical tubular stock, knurling the same to raise a circumferential band spaced from one end at a locus beginning at about the depth of contemplated insertion of the stem tube into the shoulder or crown plates, inserting a tubular reinforcement into the same end of the stem blank a distance slightly greater than the reinforcement length to form an internal shoulder in the stem blank and staking the blank and insert together. Thereafter the stem blank is chamfered and a light cut taken up to the knurled area to size the end for a light press fit into the central apertures of the aforementioned shoulder plates. A star plate or other suitable element affording a point of fender attachment is placed in the stem blank end against the insert to complete the stem sub-assembly.

Like tubular fork arm blanks are formed with respective ends adapted to a force fit in the lateral openings of the previously described plates, a particular form of which is later described in detail. Such blanks in straight form are press-fitted into a pair of lower plates, the arm blanks being held in exact parallel relation while the plates are allowed to shift into proper alignment required by the parallelism of the arm blanks. At the same time the arm blanks are locally deformed endwise in a manner whereby the plates are retained on the arm ends in proper disposition for brazing.

Thereafter the third or top plate of the shoulder or crown is applied and held in abutting aligned relation to the top or outermost plate already assembled to the arms, and the previously described stem sub-assembly is press-fitted through the aligned central apertures of the shoulder plates to bring the stem shoulder to bear on the third plate while the inserted stem end projects slightly beyond the bottom-most plate surface. In the same press-fitting set-up the projecting stem end is deformed or staked to secure the bottom-most shoulder plate thereon, and also to retain the star plate insert, with the several areas of contact among the components now also retained in proper position for the subsequent brazing operation. In the last press fitting operation the arms are supported in parallel relation.

It will be noted that the arm blanks are of axially straight form thus far in the operations of fabrication and that the plates into which they are forced are permitted to shift relatively in rotational sense as required to accommodate the enforced parallel disposition of the arm blanks. Only simply applied, axially directed press-fitting forces are required, without the diffculty of holding in proper orientation for force-fitting, and without the difficulty of applying the necessary force to, fork arms that are preformed to have required curvature along the length thereof and to have mutual lateral divergence where required.

The assembly is thereafter brazed; preferably since the assembly of this invention at this stage is so adapted, at all joints simultaneously by applying brazing material, pure copper for example, in the necessary locations and passing through a hydrogen brazing furnace. The resulting brazed joints are not only continuous over the areas of component contact giving a strong integral structure, but also the external joint areas are smooth requiring no grinding or abrading operations or use of added concealing components to eliminate unsightly areas such as result from flash or splatter in welded and some brazed joints. It may be noted that the furnace brazing operation also serves to relieve stresses in the assembly.

In further operations on the now rigid brazed assembly, the arms are formed to the desired curvature, lateral divergency and closed, slotted and trimmed bottom ends for axle accommodation; the stem is machined by turning to form a cone seat, chamfering the upper end and reaming the interior as required and threading the upper end. Thereafter the fork may be heat treated and annealed as required.

In the aforegoing, method is outlined in terms of components for a single fork. It should be obvious, however, that for mass production operations clear advantages are present in producing the sub-assemblies going into the final assembly; in the adaptability of the assembly to a single brazing operation; in avoiding distinct right and left hand forms of components while in unassembled state; and in facility of set-up operations for the final assembly operations.

An object of the present invention, insofar as fork structure is concerned, is that a strong light weight fork be provided. A further object is the provision of a fork structure which is adaptable to low cost mass production methods both in manufacture of individual components and in assembly of the same.

Insofar as method is concerned, the present invention provides for fabrication of the principal elements of a bicycle fork either from cylindrical tubular stock or from sheet or strip stock of such gauge as is readily blanked out, formed and pierced by operations on conventional equipment. A still further object is the provision of a method whereby individual sub-assemblies or components may be press-fitted by a proper sequence of operations into a partially formed assembly wherein relative position of the elements is properly established and thereafter simultaneously brazing all joints in the partially formed structure to provide a rigid partially formed assembly which may be subjected thereafter to finishing operations for deriving the final form without danger of distortion of the elements from their proper established relation. Other objects, advantages will appear from the following description and the drawings wherein:

FIG. 1 is a front elevational view of a bicycle steering fork assembly embodying the structure of and produced by the method of the present invention;

FIG. 2 is a side elevation corresponding to FIG. 1;

FIG. 3 is a fragmentary enlarged view of the crown or shoulder structure whereby the stem and fork arms are joined together with certain portions broken away;

FIG. 4 is a detail view showing in plan the form of certain components of the crown structure;

FIG. 5 is a detail fragmentary view taken along the line 5—5 in FIG. 3;

FIG. 6 is a fragmentary view taken along the lines 6—6 in FIG. 2;

FIG. 7 is a detail, partially in section, of certain parts of the stem; and

FIG. 8 represents more or less in outline form the derivation of two axially straight but tapered tubular blanks for the fork arms.

Gross structure

In the drawings FIGS. 1 and 2 there is shown, in front and side elevation respectively, a tubular steering fork assembly for the front wheel of a bicycle, having a gross form and structure known in the art comprising a pair of laterally spaced right and left arms A, parallel in lateral aspect and dependent from respective end portions of a head or transverse crown assembly or shoulder C secured to the lower end of the vertical stem or bearing tube assembly B.

The two arms A on left and right are identical tubular members symmetrically disposed, as is the entire fork assembly, about a longitudinal vertical mid-plane through the axis of the stem B, the arms being slightly downwardly divergent. As may be seen from FIGS. 1, 2 and 6 each tubular member A is oval in cross-section, generally uniform and straight in about the top third and thereafter tapering toward the bottom end 10 and also having the bottom half curved concavely forwardly, with the bottom end flattened together and slotted endwise at 11 for reception of a front wheel axle.

The crown assembly C includes a lower plate 12, a middle plate 13 and a top plate 14, which are identical in external shape and in location of a large central aperture for receiving the lower end of the stem B, the top plate however differing inasmuch as it lacks the oval apertures in its flat end portions, which—as shown in FIG. 4—are provided in the identical plates 12, 13 for receiving the upper ends of arms A. As may be clearly seen in FIG. 1, the central area of each plate is offset from but parallel to the co-planar end portions thereof, so that with the central offsets of plates 12 and 13 brazed in face-to-face relation, the corresponding apertured end portions are vertically spaced for a more stable and strong brazed connection with the top ends of the arms; and also the stem B, just inward of the lower end, is brazed and supported over two plate thicknesses. With the end portions of plates 13 and 14 brazed in face-to-face relation not only is a cap or closure provided brazed to and across the top of each arm member A, but also the central offset of plate 14 is brazed to stem B at a locus spaced upward from the middle plate 13 again to provide a strong stable connection of crown C to stem B.

The stem assembly B includes a cylindrical tube 20 with upper end 21 threaded and longitudinally slotted or grooved at 21a to form a key-way or the like formation; a generally cylindrical reinforcing insert 23 and a "star plate" 24 received in the lower end of 20 to rest against the internal shoulder formed by the end of tube 23. The star plate is centrally apertured to receive a front fender mounting screw. The tube 20, insert 21 and plate 24 are brazed together at their areas of contact.

The overall structure of the finished fork has thus far been described in general terms; hereinafter as the method for fabrication is described other particular points of structure will be considered.

Fabrication of components

In producing the plates 12, 13, 14 in the trussed type beam structure of the crown C, identical blanks are blanked out of say 11 gauge steel sheet or strip stock and formed to have the central area offset as the flat bottom of a shallow sloping walled trough, by the same blanking die or identical dies, resulting in semi-complete plates with identical external form. Next by a piercing operation to form round center and oval end apertures (with major axes parallel) on such a blank, final identical plates (of the configuration appearing in plan in FIG. 4 and in elevation in FIGS. 1, 2 and 3) are produced for use as the lower and middle plates 12, 13; and with other such blanks by piercing only a like round central aperture, the top plates 14 result. The centers of the central and elliptical apertures are collinear. If desired a slight upward boss may be formed on the end flat areas of a blank (at the time of piercing for a plate 14) at locations which will ultimately be opposite the openings of the tubular arms and may be useful in locating other parts of a finished bicycle, for example a fixed cone structure of the fork.

For the stem assembly B, a length cut from cylindrical tubular steel stock of desired gauge, e.g. 16 gauge, is knurled over a band 25 spaced inward from one end at a distance corresponding to the depth of insertion of the stem B into the shoulder or crown assembly C; the tubular reinforcing element 23 is inserted to such distance that its outer end forms a shoulder at a depth somewhat greater than the thickness of the star plate element 24, and the elements 20, 23 are staked together as at 26.

Thereafter a light machine cut is taken between the knurl and adjacent end to size the end of the stem to a diameter for a light press-fit into the three circular central openings of the plates 12, 13, 14 as hereinafter explained; and also to establish a definite shoulder 27 at the edge of the knurled exactly spaced from the adjacent end of the stem. The corresponding end of the stem assembly is chamfered either at the time the sizing cut is made, in the initial cut-off of the blank for 20, or at other apt time. By omission of the chamfer on the upper end of the stem, FIG. 7 would represent the stem sub-assembly thus far completed. The star plate 24 is then inserted in the end of 20 to complete a stem sub-assembly.

The blanks for the arms A preferably are produced by cutting off double lengths of cylindrical tubular stock, swaging the same to an oval or elliptical cross-section which tapers symmetrically from a straight central portion toward both ends of each piece, and then cutting each swaged double length in half to result in a pair of like blanks, preferably forming a chamfer on each at the cut-off point, as indicated by the parts 31 in FIG. 8.

The central portion of the swaged double length has a size and shape corresponding to the like oval apertures of the plates 12, 13 for a force fit therein as later described.

The flat star plate 24 is produced with a central aperture of desired form by any desired method.

*Assembly*

The large chamfered ends of a pair of arm blanks 31 are forced into the aligned oval apertures of plates 12, 13 with offset center portions in back-to-back relation in a suitable hydraulic press applying longitudinal force to the arm blanks while maintaining the same in parallel relation. Suitable press tooling is provided including pilot fingers for the entering ends of the blanks; supporting spacer blocks entering into the space between the sloped and parallel end portions of the plates 12, 13 and the intended location of the arm ends; and also a back-up pad for plate 13 having means therein for staking or deforming the chamfered end area of each tubular arm blank outwardly into contact with the surrounding wall of the oval aperture in plate 13, at say two or four spots, 32, as indicated in FIG. 6.

This deformation to overcome locally the arm end chamfers may be done, for example, either by fixed projections on the back-up pad for deformation simultaneously with the press-fit, or by small elements moved through the back-up pad sequentially after the arm ends have been forced to full depth flush with the top surface of plate 13. By such deformation not only are the ends of the plate 13 secured against any tendency to spring off the arm ends upon release of press-applied force, but also suitable contact of the surfaces to be brazed in subsequent operations is assured. The support of plates 12 and 13 during such force fitting operation is however to be such that the plates 12, 13 can shift into final alignment demanded by the maintained parallel and fixed relation of the arm blanks.

In the same hydraulic press, where shiftable tooling for back-up of the shoulder structure elements is used, or in a separate press, the plate 14 is aligned and held with end flats against the corresponding flats of plate 13 in the partially assembled fork resulting from the first press-fitting operation. With suitable supporting spacer blocks inserted between the off-set center portions of plates 13, 14, preferably with suitable supports bearing on the outer end flats of the plate 14, and with a back-up pad of suitable form for the central part of lower plate 12 in place, the chamfered end of the previously described stem sub-assembly is forced for a light press-fit by longitudinally applied force of the press in one stroke successively through the central apertures of plates 14, 13, 12 to protrude a short distance through plate 12 as appears in FIG. 3, the stem shoulder 27 coming to bear against plate 14. The stem is of course suitably supported to direct it at right angles through the plates.

Here again staking or localized deformation of the protruding chambered stem end may be effected at the terminal period of the press-fitting stroke of the stem by suitable staking elements on the pad or back-up block for plate 12. With the star plate 24 located in proper position before the press-fitting stroke, such staking will serve to secure plate 12 on the end of the stem and to retain the star plate pressed against the end of insert 23; and ultimately will ensure good brazing contact of the surfaces. The shoulder 27 on the stem and the end securement of the stem also will ensure excellent brazing contact of plates 14 with plate 13 and with the stem. For this second press operation, plates 12, 13, 14 are securely held in alignment, and preferably arm blanks 31 are held in proper relative positions, so that no stresses are developed to displace the arm blanks out of parallelism after removal from the press.

Next suitable brazing material is applied to the several joints of the assembled frame elements. Thus with 1010 or 1020 steel in the several components, and use of hydrogen brazing furnace contemplated, pure copper may be applied in wire form at the several locations indicated at "X" in FIG. 3. With the fork inverted into stem down position, a piece of copper may be dropped down each arm, and the copper will not only spread between the abutting flat faces of plates 13—14, but also will creep up the outer surface of each arm end portion to the joint at plate 13, in consequence of score marks formed in the forced fit passage of the arm blank through the aperture of plate 12.

The pair of long dashed lines in FIG. 1 indicate the general position of the inner sides of the arms throughout the assembly operations and immediately after brazing is completed, and the other dashed line extensions of the arms in FIG. 1 and the dashed lines in FIG. 2, the corresponding arm shapes.

After the brazing operation is completed (say at about 2000° F. for pure copper as the brazing material), and the brazed fork assembly is cooled, the straight arms are bent into curved form, flattened together and notched at the free ends, and spread if desired to attain the final form appearing by solid lines in FIGS. 1 and 2. With suitable forming-press tooling these operations can of course be carried out sequentially in one set up, or with certain of these latter operations carried out simultaneously. For example, the fork arm ends may be simultaneously flattened and notched and also curved forwardly to final shape.

After forming of the arms, the upper flat of the central offset of plate 14 and the adjacent circumference of the stem at 25a over the previously knurled area are finish cut in a final cone seat turning operation. When the cone seat is completed the upper end of the stem is reamed as required for handle bar clamping parts to be accommodated, and then chamfered. The upper end is then threaded at 21, and a suitable keyway or slot formed as at 21a.

As a final operation the fork may be heat treated as permitted by the melting point of the pure copper brazing for proper steel stock which may be particularly desirable for the upper end of the stem.

As a great variety of forming, piercing, and press-fitting apparatus and associated jigging and tooling is well known in the art here involved, and particular forms of apparatus for carrying out the method here described are per se no part of the invention as here claimed, detailed description of suitable apparatus is omitted.

The fork resulting in consequence of the structure and method herein described has the brazing material, the copper, capillarily distributed at the joining regions in the sense that the copper is present not only as a thin bonding layer between facing or abutting surfaces, but also at angularly disposed surfaces adjacent a joint between components where the copper presents a smooth small fillet, which to the eye is meniscus-like in the manner of merging smoothly into the adjacent surface of the components. Hence there is no need to remove material from the area of the joints, or to conceal the same by additional components in order to present an acceptable appearance in the fork.

I claim:

1. In the art of producing a bicycle steering fork including a stem, a pair of dependant fork arms, and a crown or shoulder structure rigidly joining the upper ends of the arms to the lower end of the stem, the steps of: forming axially straight identical tubular arm blanks;

forming a semi-finished stem; forming a shoulder structure including a pair of lateral end apertures and a central aperture; press-fitting first the arm blanks simultaneously and then the stem respectively into the lateral and central apertures; applying brazing material to the regions of the resulting press-fitted joints; subjecting the resulting assembly to a brazing temperature to produce an assembly including a semi-finished stem, a shoulder and straight tubular arm elements rigidly secured together into an integral unit; thereafter bending the arm elements simultaneously into final desired like individual shapes and mutual disposition; and heat treating the brazed assembly at a temperature below the melting range of the brazing material to develop overall strength of the fork.

2. In the art of producing a bicycle steering fork including a stem, a pair of dependant fork arms, and a crown or shoulder structure rigidly joining the upper ends of the arms to the lower end of the stem, the steps of: blanking out strip or sheet stock to form identical elongated blanks having coplanar end portions and a mid-portion offset parallel thereto; in some of said blanks piercing simultaneously identical apertures through respective end portions and a round central aperture through the mid-portion of each to form lower shoulder plates; in others of said blanks piercing only a round central aperture identical with that of said shoulder plates to form top shoulder plates; producing a stem sub-assembly including a cylindrical tube with one end sized for press-fitted insertion in said central apertures and having a circumferential shoulder terminating the sized portion, a tubular internal reinforcement fitted beyond its full length into said one end to form an internal shoulder, and a fender anchoring element inserted in the tube and against the shoulder; forming longitudinally straight identical fork arm blanks each with one end shaped correspondingly to the said apertures of the end portions for press-fitted insertion therein; placing two of said lower shoulder plates with mid-portions in face-to-face relation and end portions spaced with the apertures thereof in alignment; press-fitting the said one ends of said arm blanks simultaneously through respective end portion apertures of one plate into the aligned end portion apertures of the other of said two plates, by force applied axially to said arm blanks while maintaining the arm blanks in parallel relation and while permitting the said two plates to shift as required to accommodate the arms in press-fitted relation; simultaneously with the press fitting of the arms, deforming the end edges of the arm blanks at least locally into retaining engagement with the second plate; clamping a top shoulder plate in alignment on the other of said two plates with the respective end portions thereof in face-to-face relation; press-fitting the sized end of said stem through the top and lower plates to bring the circumferential shoulder against the top plate and simultaneously staking the sized end edge of the stem into retaining engagement with said anchor element and with the lowermost of said plates; applying brazing material to the junctures of said arm blanks with said lower plates and of said stem with all three plates; passing the assembly of the prior steps through a brazing furnace to form a rigid brazed assembly; forming simultaneously both said arm blanks to a desired final shape and mutual disposition; and heat treating the assembly at a temperature below brazing temperature range to develop the overall strength of the fork.

References Cited in the file of this patent

UNITED STATES PATENTS

| | | |
|---|---|---|
| 320,381 | Meyrose | June 16, 1885 |
| 585,043 | Metz | June 22, 1897 |
| 943,968 | Ditchfield | Dec. 21, 1909 |
| 1,322,250 | Lewis | Nov. 18, 1919 |
| 1,403,257 | Lewis | Jan. 10, 1922 |
| 1,511,350 | Meiselbach | Oct. 14, 1924 |
| 1,603,199 | Erickson | Oct. 12, 1926 |
| 1,936,083 | De Ridder | Nov. 21, 1933 |
| 1,951,306 | Johannsen et al. | Mar. 13, 1934 |
| 2,445,150 | Mueller | July 13, 1948 |
| 2,495,333 | Kraeft et al. | Jan. 24, 1950 |

FOREIGN PATENTS

| | | |
|---|---|---|
| 596,135 | Great Britain | Dec. 29, 1947 |